(12) United States Patent
Asplund

(10) Patent No.: US 8,763,774 B2
(45) Date of Patent: Jul. 1, 2014

(54) SYSTEM ADAPTED FOR ONE OR MORE ELECTRICALLY PROPELLABLE VEHICLES (RAIL STRUCTURE)

(75) Inventor: Gunnar Asplund, Solna (SE)

(73) Assignee: Elways AB, Solna (SE)

( * ) Notice: Subject to any disclaimer, the term of this patent is extended or adjusted under 35 U.S.C. 154(b) by 0 days.

(21) Appl. No.: 13/638,603

(22) PCT Filed: Mar. 31, 2011

(86) PCT No.: PCT/SE2011/050380
§ 371 (c)(1),
(2), (4) Date: Sep. 30, 2012

(87) PCT Pub. No.: WO2011/123049
PCT Pub. Date: Oct. 6, 2011

(65) Prior Publication Data
US 2013/0020164 A1     Jan. 24, 2013

(30) Foreign Application Priority Data

Apr. 1, 2010  (SE) .................................. 1000326-7

(51) Int. Cl.
*A63H 19/30*   (2006.01)
(52) U.S. Cl.
USPC ........................................ 191/29 R; 104/243
(58) Field of Classification Search
USPC ....... 191/22 R, 29 R, 30, 31, 32, 33 R; 246/9, 246/65, 67, 69
See application file for complete search history.

(56) References Cited

U.S. PATENT DOCUMENTS

| | | | | |
|---|---|---|---|---|
| 3,914,562 A | * | 10/1975 | Bolger | 191/10 |
| 4,129,203 A | * | 12/1978 | Berman | 191/48 |
| 4,227,595 A | * | 10/1980 | Hamada | 191/2 |
| 4,969,400 A | * | 11/1990 | Burg et al. | 104/247 |
| 5,764,127 A | * | 6/1998 | Hore et al. | 336/143 |
| 6,011,508 A | * | 1/2000 | Perreault et al. | 342/350 |

(Continued)

FOREIGN PATENT DOCUMENTS

WO     03104016 A1    12/2003

OTHER PUBLICATIONS

Notification of Transmittal of the International Search Report and the Written Opinion of the International Searching Authority, or the Declaration issued on Jun. 29, 2011 by the SE International Searching Authority in International Application No. PCT/SE2011/050380.

*Primary Examiner* — Jason C Smith
(74) *Attorney, Agent, or Firm* — Raymond R. Ferrera; Adams and Reese LLP

(57) ABSTRACT

A rail structure related to a track of a system adapted for electrically driving a vehicle along a roadway. The vehicle is provided with a current collector which is displaceable up and down and sideways in relation to the direction of transportation, in order to be brought into mechanical and electrical contact with elongated tracks positioned below the roadway and comprising a conductor adapted to be supplied with current and put under voltage. The rail structure comprises one or more tracks oriented parallel with external wall sections made of metal, and a partition separating the external wall sections and comprising an intermediate wall made of an electrically conductive material. Conductors are arranged in a lower portion of the tracks, respectively. The tracks comprise electrically insulating layers applied to surface portions facing each other of said wall sections and the partition, the insulating layers being coordinated with the lower portions and intended to support the conductors.

18 Claims, 4 Drawing Sheets

(56) References Cited

U.S. PATENT DOCUMENTS

Figure 1A:
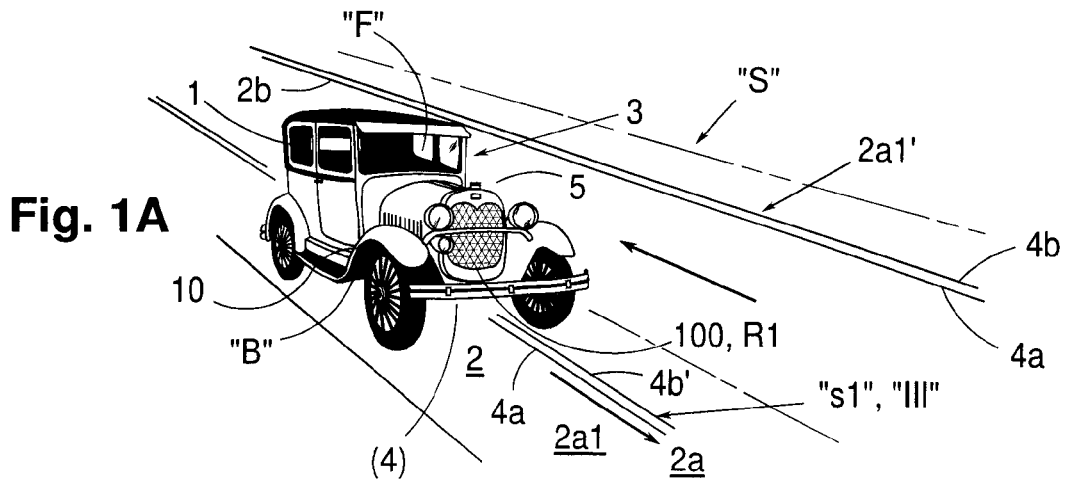

| | | | |
|---|---|---|---|
| 6,374,748 B1* | 4/2002 | Shiwaku et al. | 104/243 |
| 8,531,153 B2* | 9/2013 | Baarman et al. | 320/108 |
| 8,544,622 B2* | 10/2013 | Vollenwyder et al. | 191/10 |
| 2011/0061559 A1* | 3/2011 | Lund | 104/119 |
| 2011/0266109 A1* | 11/2011 | Meins et al. | 191/29 R |
| 2013/0020164 A1* | 1/2013 | Asplund | 191/29 R |
| 2013/0020165 A1* | 1/2013 | Asplund | 191/29 R |
| 2013/0126287 A1* | 5/2013 | Kanemori et al. | 191/29 R |

\* cited by examiner

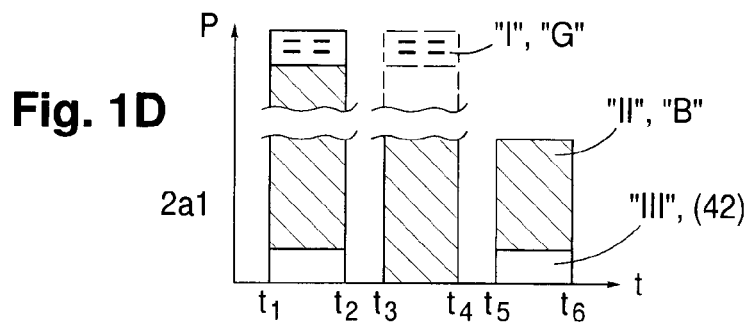
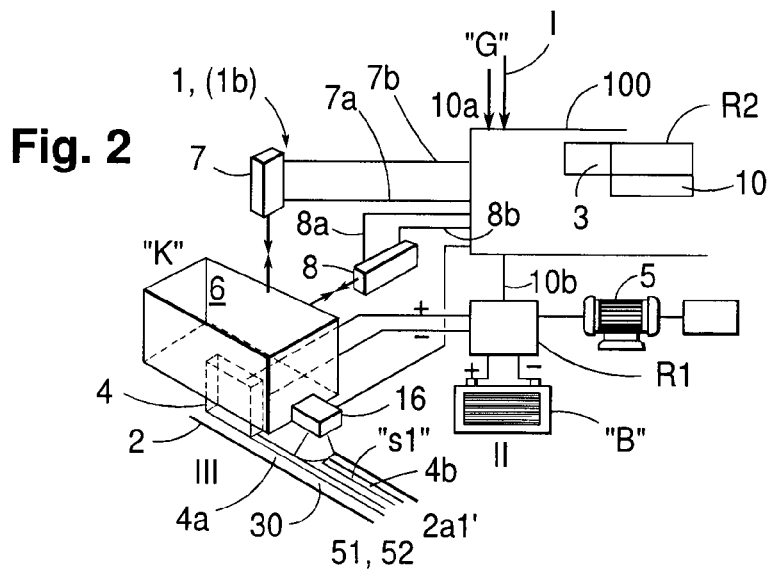
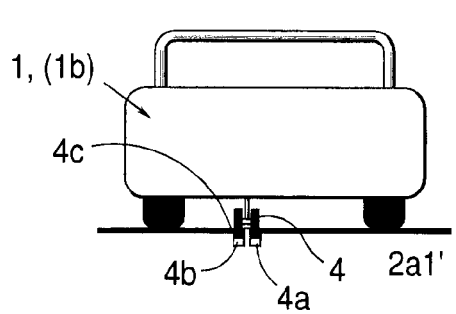
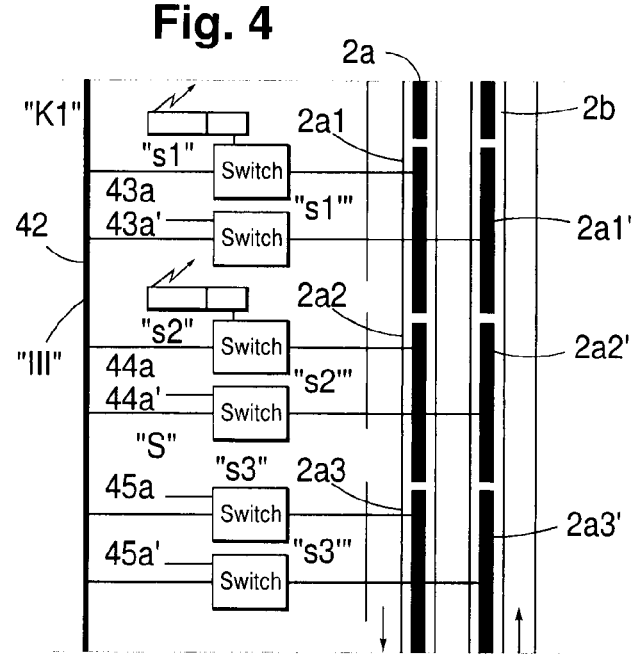

SYSTEM ADAPTED FOR ONE OR MORE ELECTRICALLY PROPELLABLE VEHICLES (RAIL STRUCTURE)

TECHNICAL FIELD OF THE INVENTION

This invention refers generally to a rail structure having at least one, usually two tracks, each track is enclosing an electric conductor exposing a conductor surface, adapted for a cooperation with a current collector arrangement, which is adapted to be able to elevate and lower contact means and/or a contact device, in the for of current collectors, with each vehicle being adapted to a system appropriate for electrically propellable vehicles and more particularly to such system in which i.a. one or more batteries and/or a set of batteries for power adaptation and energy storage are intended for being able to propel the vehicle rolling along a stretch of a roadway.

Systems of this type are based on utilizing a specifically designed stretch of the road or roadway wherein the upper surface of this stretch of the roadway exhibits at least one track in the form of groove and in which track two or more parallel electric conductors or strips with a conductor surface, which may be placed under power or voltage are disposed and which preferably are provided with uncovered and uninsulated contact surface sections.

In accordance with the instructions of the present invention such system is to comprise; "a" a plurality of roadway sections or portions subdividing the total stretch of the roadway and each allotted to one or more electrically conductive surfaces, such as conductors or strips, said roadway portions being connectable, over a switch, to one or more stationary electric stations serving as a source of power or energy external to the vehicles, so as thereof i.a. to charge batteries belonging to the vehicles and/or sets of batteries intended primarily to propel the vehicles by means of said set of batteries along the stretch of the roadway and its roadway sections or portions and "b" one or more, over an individual electric motor or a plurality of motors, propellable vehicles, wherein each of said vehicles is to exhibit a control circuit controlling the power so as to create a chosen and required propelling effect and/or a speed adaptation and/or control.

The invention is to be applied to stretches of roadways in the form of public and private roads and along their road sections or portions but can also find use in industrial systems having different requirements of power and energy.

The invention has the purpose i.a. of concurrently with power charging of the set of batteries from the external source of energy supplying the power and the energy which will be required for a chosen power requirement for driving the vehicle upwards and over an upwardly rising portion of the roadway.

More particularly, the present invention refers to such system in which a non-railbound vehicle, such as a freight vehicle, while being driven along chosen roadway sections or portions by means of the set of batteries allotted to the vehicle, can be supplied with supplementary power and energy, such as from the external source of power or alternatively from a source of power related to the vehicle, such as a diesel generator.

In this regard the present invention proposes a "first" source of power related to the vehicle, such as a diesel generator, a "second" source of power related to the vehicle, such as a battery set, and a "third" source of power separated from the vehicle and being disposed externally, such as two or more conductor surfaces, such as conductors or strips which may be placed under power and be included in tracks or grooves in successive roadway sections or portions, with the conductors of a chosen roadway section being electrically insulated from corresponding conductors in an adjacent (preceding or succeeding) roadway section or portion.

The present invention is based on having two or more conductors built into one track or into individual tracks or grooves in their respective roadway sections or portions, with said tracks (not the conductors) extending continually from roadway section or portion to roadway section or portion.

The voltage which is allotted to these conductors can be an alternating voltage (AC power) (with a vehicle-related rectifier) or a direct voltage (DC power). In choosing a DC power one of the conductors can be positive, whereas the other conductor can be negative and an additional conductor can be allotted ground potential or zero potential, with the vehicle being operated at twice the value of the voltage.

With alternating voltage to the conductor of the roadway sections said voltage can to advantage be disposed in antiphase and symmetrically around a ground potential or zero potential.

The motor intended for driving the vehicle can be of the DC power type or of the AC power type, with a converter being connected prior to the motor in the latter case.

BACKGROUND OF THE INVENTION

Methods, arrangements, and structures related to the technical field and character mentioned above are known earlier in a number of different embodiments.

With regard to electrically propellable vehicles, the latter can to advantage be categorized as "railbound vehicles" or as "non-railbound vehicles".

"Railbound vehicles" are driven along their stretch of the roadway and roadway sections on parallel rails disposed in their stretch of the roadway or on parallel rails laid open by sleepers or the like and guiding the fixed pairs of wheels of the vehicle.

"Non-railbound vehicles" are conveyed along their stretch of the roadway and roadway sections or portions over a road and are driven along the roadway sections or portions by guiding control equipment associated with the vehicle.

The present invention is based on and is intended to be used in the latter category and technology and is intended to be applied primarily to heavy trucks with or without connected trailers, wherein from U.S. Pat. No. 4,129,203-A a vehicle-related arrangement is known for letting contact springs disposed beneath the vehicle be brought upwards and downwards and sideways towards and to mechanical and electrical cooperation with or away from cooperation with non-insulated surface sections of the electric conductors (14) subjected to voltage and associated with each roadway section or portion.

Utilizing an insulator (16) in a channel (18) which supports the conductors in the form of rails (14) is indicated here. A cover plate (20) provided with a slit (12) is removably attached to the upper and opposing wall portions of the channel (18), with this cover plate (20) being adjusted to a plane connecting to the upper surface (22) of the roadway section or portion.

FIGS. 2 and 3, respectively, in the mentioned Patent Publication describe a vehicle-related table (98) to which an arm (10) is rotatably attached (94, 96, 99). Sensors (30) allotted to the table (98) generate signals which with regard to their phase and magnitude indicate the direction to and distance from an axis (99) of rotation to a slit (12) in the cover plate (20) which is based on changes in a generated magnetic field.

The table (98) and arm (10) can be driven over a designated mechanism (31) by a motor (32) between predetermined limits and limit switches (40, 41) positioned there.

Patent publication WO 93/10995-A discloses an earlier known system for driving electrically controllable vehicles along a road and its roadway sections or portions.

Figure 9:
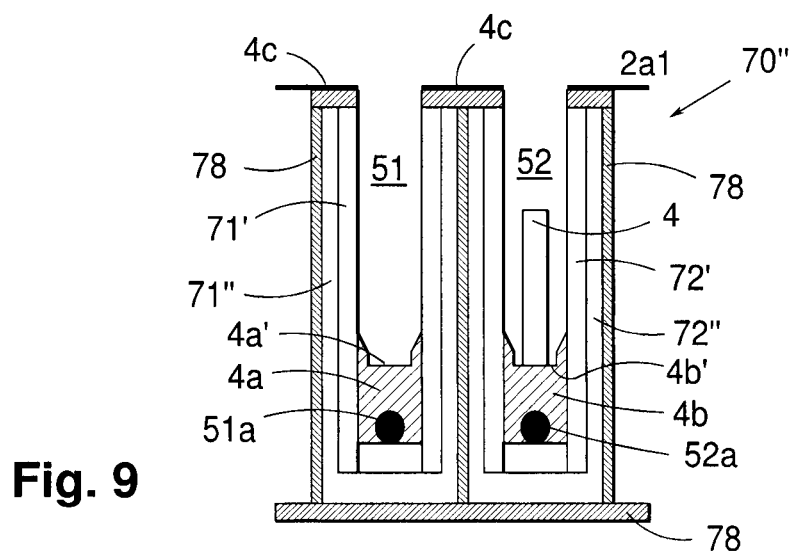

FIG. 9 in the mentioned patent publication clarifies the basic structure of the system.

It is instructed here that the extension (14) of the roadway and its roadway portions are to be provided with electrically conductive road sections (300a-300f), wherein a roadway section may be considered to correspond to a roadway portion.

The vehicle (310) has an electric motor (320) and two (312, 314) or three (312, 312' and 314, respectively) contact springs lying therebelow and being adapted for mechanical and electrical contact with the electrically conductive conductors whose lengths are adapted to correspond to a chosen length (identically equal lengths) for utilized roadway sections or portions.

The electrically conductive conductors in the road sections (300a-399f) are disposed after each other with an intermediately oriented free space (302a-302e) so as thereby to prevent short-circuits in consequence of dragging contact springs (312, 312', 314).

All other road sections (300a, 300d, 300f) are connected here continually to a reference voltage (ground potential), whereas the remaining road sections (300a, 300c, and 300e, respectively) are either directly connectable to a source (440) of DC voltage or can be connected over a connecting means (304a, 304b, 304c) to any appropriate electric power source (308) when a vehicle is in the vicinity.

When an embodiment having three contact springs is to be utilized the distance between them is to be chosen such, that two or three contacts always are in electric contact with two road sections exhibiting opposite polarities and that neither of the two contacts is to be able to short-circuit the open space (302a-302e) between two adjacently positioned sections or portions.

For its function the system here requires specially structured vehicles (310), wherein the chosen distance between front (314) and rear (312, 312') contacts is to be identical and furthermore to be chosen somewhat greater than the equal lengths of the roadway sections (300b, 300d).

Thus, specially structured vehicles with front and rear contacts are required and in which each one of the utilized road sections (300a-300f) is to be chosen having equal lengths and are to be positioned behind each other in the direction of motion of the vehicle with equal mutual free and intermediately lying spaces (302a-302e).

The remainder of the Patent Publication shows the existence of a single conductor or rail subjected to voltage in a road section (Page 5, lines 11-13) and that a vehicle is to attract a voltage to a roadway section lying in front (Page 5, lines 19-21; page 6, lines 7-10; page 8, lines 28-32, respectively).

Furthermore it is indicated that bars or rails (16), which may be subjected to voltage, can be provided with side-positioned drainage tracks (page 9, lines 1-4).

Lack (or presence) of an activating signal is to be able to influence a control unit (38) (Page 8, lines 23-27, respectively).

The necessary distance between vehicle-associated contacts is disclosed in lines 17-20 of page 10, and utilizing activity-initiated radio signals is suggested in lines 2-4 of page 11 and lines 1-16 of page 14, respectively.

Furthermore, in lines 21-23 of page 15 and lines 1-15 of page 16, utilizing a Hall element (240) and connecting it to an amplifier (246) is suggested. Furthermore, alternatives thereof are illustrated in lines 3-9 of page 17.

It is also known to have a vehicle driven electrically along a stretch of roadway by means of inductive transfer of energy active between a vehicle and a roadway section and a road portion laying therebelow.

As examples of this known technology reference is also made to the contents of U.S. Pat. No. 3,914,562-A and U.S. Pat. No. 4,007,817-A, respectively.

Patent publication WO 2007/056 804 A1 describe and disclose a plurality of means, devices and/or arrangements which have relevance when evaluating the significant features related to the prior art and also to the present invention. However, these means, devices and/or arrangements are only mentioned in general terms, and only a few or no suggested structure is disclosed.

The contents of this patent publication will be described in the following and coordinated under the following subsections;

a. Pairs of electrically conductive contacts or strips oriented along a roadway.
b. Switching means to supply DC power to a roadway related pair of electrically conductive contacts or strips. (DC network).
c. Vehicle related transmitter.
d. Vehicle related pick-up arms.
e. DC voltage difference between roadway related conductors, contacts or strips.
f. Orientation of the roadway related conductive strips.
g. Power supply system.
h. Detector means or arrangements.
i. Power supply to an adjacent pair of conducting strips.
j. Sensor arrangements.
k. Conditions for activating switching means.
l. Battery arrangements.
m. On-board charging engine.
n. Overload cut-off and re-close switch.
o. Safe conditions of bare electric roadway related electric conductors or strips.
p. Use of DC voltage or AC voltage to supply power to the roadway related electric conductors or strips.
q. Magnetic field sensor.
r. Snow plough and blower arrangements.
s. Electrical heating tape.

a. Pairs of Electrically Conductive Conductors or Strips Oriented Along a Roadway.

It is suggested in the above-mentioned International Patent Publications that each pair of electrically conductive strips (members) be electrically insulated from an adjacent and another pair of electrically conductive strips, and wherein a vehicle traveling along said roadway travels over a first pair of electrically conductive strips and then travels over a next adjacent pair of electrically conductive strips and so forth.

b. Switching Means to Supply Dc Power to a Roadway Related Pair of Electrically Conductive Contacts or Strips (DC-Network).

A source of direct current electricity (DC network) is arranged to provide DC power to the roadway related pairs of electrically conductive strips (members).

Switching means are operative to supply DC power to a pair of electrically conductive strips when a vehicle travels over that pair, said switching means being operative to turn off the supply of DC power to a pair of electrically conductive strips when no vehicle travels over and along that pair of electrically conductive strips.

This improves the safety of the system as suggested (page 2, lines 13-17) in that switching means are operative to supply DC power to said pair of electrically conductive strips (members) only when a vehicle travels over that pair, the switching means being operative to turn off the supply of DC power to a pair of electrically conductive strips when no vehicle travels over that pair of electrically conductive strips.

Said Patent Publications further mention (page 1, lines 7-21) a prior art system for the universal use of electrically powered roadway vehicles. A system of this kind uses a succession of 20 meter long copper strips fixed onto a roadway surface. The respective 20 meter long copper strips were positioned end to end along each lane of the roadway and were electrically insulated from each other.

Alternating current electric power (AC network) was applied to each section or portion.

c. Vehicle-Related Transmitter.

When an appropriate electrically powered vehicle travels over the respective sections of copper strip, a transmitter mounted to the vehicle turns on the power supply to the section of copper strips over which the vehicle is traveling.

d. Vehicle Related Pick-Up Arms.

Electrically operated pick-up arms on the vehicle are adapted to contact the copper strips and to obtain electricity from the roadway-related copper strips.

This electricity from the copper strips is used to run a vehicle-related electric motor on board the vehicle (and also to activate vehicle accessories and, optionally, to re-charge batteries in the vehicle).

The electricity supply to each copper strip is turned on only during 1.5 seconds, i.e. the time period during which the vehicle passes over that section of copper strips.

In the absence of a signal from a vehicle, the power to that section of copper strip remains off.

In order for the vehicle to be able to pick up electric power from the roadway-related conductors or strips positioned on the roadway surface, the vehicle may be provided with a pick-up arm located under the vehicle body.

The pick-up arm may comprise a flat plate hinged to the underside of the vehicle.

Two pick-up carbon brushes may be bonded to the plate, for example by an epoxy resin or adhesive.

Leads carry the power from/to each brush to the vehicle (to the motor controller and battery pack of the vehicle). (Page 7, lines 8-13)

The pick-up arm may be retracted and extended automatically.

For example, if the vehicle detects that it is traveling over a pair of electrically conductive strips (members), the pick-up arm may be automatically extended downwardly such that the brushes contact the electrically conductive strips.

In one embodiment, the electrically conductive arm is operated such, that if power is lost for more than a predetermined time period, such as from one-half to one second, the pick-up arm is automatically retracted. (Page 7, lines 14-19.)

Vehicles traveling over the pairs of copper strips must be able to pick up electric power from those strips.

A large number of different designs may be used in this regard. However, one possible design is shown with reference to FIG. 2.

In FIG. 2 a vehicle 50 having wheels 52, 54 is provided with a plate 56. The plate 56 may for example be approximately 1.620 mm wide and 100 mm long.

The plate 56, as shown in FIG. 2, stretches approximately across the full width of the vehicle.

The plate 56 may be provided with one or more holes to enable air to pass therethrough to reduce the amount of down force acting on the plate when the vehicle is traveling.

The plate 56 carries two electrically conductive brushes 58, 60.

A gap 62 is located between the brushes 58, 60.

As an example, each brush may be 800 mm wide and the gap may be 20 mm wide.

The gap 62 may be filled with an electrically insulating material, suitably an insulating material that is somewhat soft and can yield without breaking, should it contact an object. (Page 14, lines 7-18)

The use of a wide pick-up plate eliminates the need for a lateral traversing mechanism for the pickup arm.

It also eliminates the need for any device to detect the vehicle's lateral position in relation to the electrically conductive strips.

All a driver has to do to achieve initial contact is to drive along the electrically conductive strips somewhere within the vehicle's track and move the pick-up arm to the down position.

Contact will be maintained so long as the electrically conductive strips remain within the vehicle track.

Automatic steering may be used to assist in this regard on a longer drive. (Page 14, lines 27-30, page 15, lines 1-2)

The brushes 58, 60 must be able to be lowered onto the strips or retracted against the underside of the vehicle.

To this end, the brushes are mounted on a pair of pantograph arms 64, 66.

The pantograph arms keep the plate 56 (and therefore the brushes 58, 60) horizontal.

Appropriate electrical connections may be provided to enable the electric power picked up from each of the brushes 58, 60 to be transferred to the vehicle.

The pantograph arms may carry appropriate electrical cables to transfer electric power from the brushes to the vehicle. (Page 15, lines 4-10)

e. DC-Voltage Difference Between Roadway Related Conductors, Contacts or Strips.

It is further suggested (Page 2, lines 18-22) that preferably a DC power with its voltage exposes a difference between each conductor or strip in a pair of conductors and that said voltage does not exceed 600 volts. More preferably, the DC power and its voltage difference between each conductor in a pair of conductors or strips do not exceed about 450 volts. Suitably, each conductor is at a voltage relevant to ground that does not exceed plus or minus 250 volts, more preferably not exceeding plus or minus 225 volts.

f. Orientation of the Roadway Related Conductive Strips.

The electrically conductive strips may be positioned on the roadway surface such that they are insulated from each other and from ground (the road surface). Suitably, the electrically conductive strips are laid onto an adhesive insulating base, which insulates them from each other.

The electrically conductive strips may be bonded to the roadway surface by an epoxy adhesive. Alternatively, the electrically conductive strips may be bonded to tiles that are then placed in or on the roadway surface.

g. Power Supply System.

The power supply system comprises a series of separate, electrically insulated but electrically conductive strips.

Each pair of strips represents a power supply section.

Each pair of strips may be provided with a dedicated source of DC power.

Alternatively, a source of DC power may provide direct current electricity to two or more pairs of strips.

h. Detector Means of Arrangement.

The switching means is suitably operatively associated with a detector means for detecting the presence of a vehicle either about to move on to a pair of conductors or strips or on a pair of conductors.

For example, the coded signal may comprise an oscillating voltage similar to that used by utility companies for control purposes.

Such a control signal may have a frequency in the order of 400 kHz and a voltage of about 4 to 20 volts.

It will be understood that the coded signal may utilize different frequencies and different voltages from those given above. (Page 4, lines 19-29)

When one roadway section of conductors or strips is turned on, a control signal may be sent to the power supply for the next section of conductors along the path of travel of the vehicle.

This control signal, sent to the power source for the next section of conductors or strips, is used to turn on the power supply to the next section of conductors, either shortly before or just as the vehicle arrives at the next section of conductors.

Alternatively, the control signal sent to the next section of conductors or strips may turn on the power supply to that next section of conductors a predetermined time after the power supply to the first set of conductors or strips is activated.

In order to detect the arrival or imminent arrival of a vehicle in a section of copper strips, the vehicle may be provided with a coded signal that becomes superimposed on the strips when the vehicle travels over a section or portion of the copper strips and the brushes on the vehicle are in contact with the strips.

The coded signal is received by a detector associated with a corresponding transformer station.

The detector actuates the switching of power up to that particular section of the strips.

i. Power Supply to an Adjacent Pair of Conductive Strips.

The power supply to the next set of conductor means or strips is maintained, provided that the next set of conductors or strips detects that the vehicle enters the next set of conductors or strips within a specified time period after the power supply to the next set of conductors or strips has been turned on.

In this way, if the vehicle turns off the roadway and therefore does not enter the next set of conductors or strips, the next set of conductors or strips will not detect the presence of the vehicle and therefore will shut off the power supply shortly after it has been turned on.

In this embodiment, the adjacent sections of conductors "talk" to each other and interact with each other to turn on the power supply to each roadway section with its strips either just before or just as a vehicle arrives at each section.

j. Sensor Arrangement.

A sensor arrangement may be located towards the "downstream" end of each pair of strips.

The sensor arrangement may, for example, be a current flow sensor positioned below or adjacent to one of the electrically conductive strips.

When a vehicle is near the end of a roadway section (of electrically conductive strips), the sensor will sense the resultant current flow and then send a signal to the next section of electrically conductive strips to turn on the electricity supply to the next section in "anticipation" of the imminent arrival.

This signal may be sent via cable. The "anticipatory" signal is valid for a short time only, say 2 seconds, and if a vehicle has not arrived at the next section within that time, the next section is turned off.

k. Conditions for Activating Switching Means.

The switching means may be arranged such that the signal, that is used to turn on the next pair of conductive strips, must be larger than a predetermined minimum value in order to activate the switching means and turn on the next pair of conductive strips.

In this manner, if the next pair of conductive strips is subject to conditions of high electrical leakage, the signal will be lower than the minimum required to turn on the next pair of strips.

This is effective to minimize excessive electrical leakage which could lead to unacceptable power wastage and/or damage to the transformer/rectifier. (Page 4, lines 28-29, page 5, lines 1-4).

The use of a coded signal also allows for the possibility of enhanced operation and safety by incorporating an electricity leakage test into the apparatus.

In these instances, an electrical leakage detection means may be provided to prevent the next section of conductors or strips from turning on.

Detection of electrical leakage may occur by requiring the coded signal superimposed on each section of conductors or strips to exceed a predetermined activation threshold value before the next section of conductors or strips will be turned on.

In this fashion, superimposing the coded signal onto the conductors or strips will result in the coded signal representing the criteria not exceeding the predetermined threshold value if conditions of high electric leakage are present. Thus, the next section of conductors or strips will not be turned on in such situations. (Page 8, lines 15-28)

l. Battery Arrangements.

The vehicle may be provided with one or more batteries to store electric power or energy.

The batteries may be charged using electricity received from the roadway related electrically conductive strips.

In some embodiments, the DC voltage of the electrically conductive strips is such that it is equal to the normal charging voltage of each battery pack in the vehicle.

This allows for the vehicle motor to have an essentially seamless transition to and from battery and on-road conductors or strips, whenever there is a break and then a resumption of the on-road conductors or strips. (Page 6, lines 29-30, page 7, lines 1-5)

m. On-Board Charging Engine.

The vehicle may alternatively or additionally be provided with one or more of an on-board charging engine or a regenerative braking system to allow for recharging of the batteries. (Page 7, lines 6-7)

n. Overload Cut-Out and Re-Close Switch.

Each transformer may have an overload cut-out and reclose switch.

This switch suitably operates on the DC side of the transformer and a rectifier. Each DC output line from the transformer and rectifiers may have independent overload switches.

The overload cut-out and re-close switches may be set such that, if three re-close attempts are unsuccessfully made, the section is shut down and a signal is automatically sent to the control panel to indicate a fault.

Vehicles may then proceed across this dead section using an on-board battery power system. (Page 12, lines 10-16)

o. Safe Conditions of Bare Electric Roadway Related Electric Conductors or Strips.

A question may be raised as to whether bare electric conductors or strips onto a road surface can be safe? In the system here proposed, they are safe.

In particular, the present invention uses mains power but delivers DC voltage at relatively low volts.

Moreover, each copper conductor or strip is insulated from the roadway surface and from the other copper conductor or strip in its respective pair.

Thus, standing on one of the conductors or strips will not complete any circuit and therefore little or no current will flow through a person standing on one of the copper conductors or strips.

Further, the DC voltage supply to the conductors or strips is created by transforming and rectifying high voltage, three-phase (alternating current) AC power, to give a positive DC power to one conductor or strip and an equal negative DC power to the other conductor or strip in each pair of conductors or strips. (Page 12, lines 19-20)

p. Use of DC Voltage or AC Voltage to Supply Power to the Roadway Related Electric Conductors or Strips.

The use of DC voltage rather than AC voltage contributes to the electrical safety of the system.

The actual DC voltage that is supplied to the pairs of copper conductors or strips will depend upon several factors.

For example, the lower the standard DC voltage selected, the lower will be the perceived electrical safety risk, the lower will be the actual energy leakage, when a roadway is wet and the conductors or strips are on and the fewer the number of battery cells in each vehicle to provide an on-board power supply.

On the other hand, the weight of copper conductors or strips and/or the number of transformers needed for the on-road installation is inversely proportional to the square of the standard voltage.

That is to say, other things being equal, if the voltage is halved, the weight and cost of copper material needed will rise fourfold.

It has been found that possible standard voltages may lie anywhere between about 100 and 600 DC voltage. (Page 12, lines 3-12)

q. Magnetic Field Sensor.

An array of magnetic field sensors may be placed across the front and rear of the vehicle (Page 20, lines 3-9) to sense the position of the conductive strips.

r. Snow Ploughs and Blower Arrangements.

The use of snow ploughs and blower arrangements is also suggested. (Page 21, lines 28-30.)

s. Electrical Heating Tape.

It is also suggested to use an electrical heating tape beside each conductor or strip to aid the clean removal of snow and ice in winter time. (Page 22, lines 1-3.)

This invention has the purpose of concentrating to an arrangement related to vehicles for operating contact means or current collectors disposed beneath the vehicle upwards and downwards so as to be able to coordinate the utilization of a first and a second source of energy allotted to the vehicle, such as a diesel generator and a set of batteries, as well as source of power, external to the vehicle, and disposed along the stretch of a roadway and its roadway section and having its upwardly facing open tracks connecting to each other from roadway section to roadway section with two or more parallel electric conductors with conductor surfaces introduced deposited in each roadway section.

This invention has the purpose of being concentrated to a rail structure as a track, which is adapted to a stretch of roadway and its individual roadway sections, which are intended to be capable of receiving and leaving a vehicle-related arrangement for actuating up and down as well as sideways contact means as current collector disposed below the vehicle.

DISCLOSURE OF THE PRESENT INVENTION

Technical Problem

If the circumstance is considered, that the technical considerations that a person skilled in the relevant technical art will have to carry out in order to offer a solution of one or more posed technical problems are on the one hand initially a necessary insight into the measures and/or the sequence of measures which are to be performed and on the other hand a necessary choice of the one or several means which are required, the following technical problems must be considered to be relevant in consequence hereof in producing the present subject of invention.

Considering the earlier standpoint of technology as it has been described above, it should therefore be seen as a technical problem to be able to understand the significance of, the advantages related to and/or the technical measures and considerations which will be necessary for conveying an electrical, and by i.e. one or more batteries in a set of batteries, conveyable vehicle along a stretch of a roadway and its roadway portions adapted system, which is to comprise; "a" a plurality of road sections or portions for subdividing the stretch of the roadway, wherein each one of these roadway portions is allotted one or more elongated tracks or slits having introduced therein current supplyable and under voltage placeable electrically conductive conductors or strips, connectable over a switch to one or more power sources as stationary electric stations, serving as an external source of power (designated as a third source of power in the following) of the vehicle so as to thereby i.a. charge said set of batteries associated with the vehicle, which set is to be able to propel the vehicle directly along the roadway sections, and "b" one or more vehicles, propellable over an individual electric motor or motors, and wherein the respective vehicle exhibits a control circuit, controlling the necessary power for creating necessary power and/or speed control, indicating the possibility of utilizing equal or different lengths of parallel electric conductors or strips, which may be subjected to electric power or voltages, related to mutually electrically insulated road sections so as to therein offer a possibility of choosing the lengths of the conductors and road sections in response to established requirements of a "continuous" supply of energy to the vehicle and its set of batteries and wherein the lengths of the respective roadway section to advantage can be chosen considerably longer than the total length of the vehicle, so that no adaptation of the lengths of the road sections to any standard lengths of the vehicles will be required such as in known technology.

There is a technical problem or a technical consideration in being able to understand the significance of, the advantages related to and/or the technical measures and considerations which will be required for letting said track be parallel oriented in a rail structure or track having external wall sections made of metal and a partition separating the external wall sections, that a first conductor surface, which can be subjected to voltage, is to be allotted a lower portion of a first track, limited by a first external wall section and said partition, and that a second conductor surface, which can be subjected to voltage, is to be allotted a lower portion of a second track limited by a second external wall section and said partition.

There is a technical problem in being able to understand the significance of, the advantages related to and/or the technical measures and considerations which will be required for having the partition made of an electrically conductive material.

There is a technical problem in being able to understand the significance of, the advantages related to and/or the technical measures and considerations which will be required for letting a first track be allotted to a first electrically insulating layer, applied to surface portions facing each other for a first wall section and the partition, which insulating layer is to be coordinated with a lower portion and is intended to support a first conductor surface, which may be subjected to voltage.

There is a technical problem in being able to understand the significance of, the advantages related to and/or the technical measures and considerations which will be required for letting a second track be allotted to a second electrically insulating layer, applied to surface portions facing each other for a second wall section and the partition and that this insulating layer is to be coordinated with a lower portion and is intended to support a second conductor surface, which may be subjected to voltage.

There is a technical problem in being able to understand the significance of, the advantages related to and/or the technical measures and considerations which will be required for letting the first electrically conductive layer of the partition be separate from the second electrically insulating layer.

There is a technical problem in being able to understand the significance of, the advantages related to and/or the technical measures and considerations which will be required for letting at least one of two or more electrically insulating layers be adapted to form an upper edge, located below an upper edge portion for its allotted track.

There is a technical problem in being able to understand the significance of, the advantages related to and/or the technical measures and considerations which will be required for letting the wall sections and the partition be structured in a rail-shaped piece, made of an electrically insulting material which in its cross section has been shaped as an "E".

There is a technical problem in being able to understand the significance of, the advantages related to and/or the technical measures and considerations which will be required for letting three parallel shanks for the piece shaped to an "E" together be shaped with the same or essentially the same thicknesses and lengths.

There is a technical problem in being able to understand the significance of, the advantages related to and/or the technical measures and considerations which will be required for letting the shank-shaped piece of electrically insulating material be enclosed in a rail, shaped as a "U" of an electrically conductive material.

There is a technical problem in being able to understand the significance of, the advantages related to and/or the technical measures and considerations which will be required for letting the free ends of the "E"-shaped piece support one or more electrically conducting conductors for a connection to ground.

There is a technical problem in being able to understand the significance of, the advantages related to and/or the technical measures and considerations which will be required for letting the two shanks of the "E"-shaped piece support the first and second conductor with its conductor or contact surfaces, allotted to individual lower portions.

There is a technical problem in being able to understand the significance of, the advantages related to and/or the technical measures and considerations which will be required for indicating in a vehicle-related arrangement as disclosed above the utilization of the vehicle-related contact or current collector, means which is to be adapted to comprise an elongated arm whose end portion is rotatably attached to the underneath side of the vehicle and whose other end portion is adapted to support said contact means for a cooperation with said rail or track.

There is a technical problem in being able to understand the significance of, the advantages related to and/or the technical measures and considerations which will be required for letting the underneath structure or bottom of the vehicle be provided with one or more sensors intended to be able to sense the existence of and/or the orientation of a roadway section and its track allotted to the roadway so as to thereby transfer a sensed information to a control equipment.

There is a technical problem in being able to understand the significance of, the advantages related to and/or the technical measures and considerations which will be required for letting the control equipment be adapted to be comprised of a control circuit, which in a sensed existence and a sensed orientation in a chosen area of coverage is to be adapted to be able to affect a means lowering (or raising) the contact means over a generated output signal.

There is a technical problem in being able to understand the significance of, the advantages related to and/or the technical measures and considerations which will be required for letting an end portion of an elongated arm be disposed in front of a second end portion, counted in the momentary direction of travel of the vehicle.

There is a technical problem in being able to understand the significance of, the advantages related to and/or the technical measures and considerations which will be required for letting one end portion of the elongated arm be oriented behind the second end portion, counting in the momentary moving direction of the vehicle.

There is a technical problem in being able to understand the significance of, the advantages related to and/or the technical measures and considerations which will be required for letting, in relation to a vertical plane allotted to the vehicle, such as a plane connecting to a direction of travel, the contact means with its elongated shape take an angular value with regard to the elongated arm corresponding to the angular value of this arm as related to a vertical plane allotted to the vehicle.

There is a technical problem in being able to understand the significance of, the advantages related to and/or the technical measures and considerations which will be required for letting the contact means be adapted to support at least two contact means or current collectors or two contact implements oriented after each other.

There is a technical problem in being able to understand the significance of, the advantages related to and/or the technical measures and considerations which will be required for letting conductors and its conductor surfaces, which may be subjected to voltage, and which may be transferred as current collectors and be allotted to the vehicle and adapted to extend along said elongated arm in the direction from one of its end portions and over to the vehicle and to a circuit distributing one or more sources of power.

There is a technical problem in being able to understand the significance of, the advantages related to and/or the technical measures and considerations which will be required for letting sensor units allotted to the vehicle, as side-related, be connected to the control equipment and intended to indicate a maximized limit value of the displacement of the contact means or current collectors.

There is a technical problem in being able to understand the significance of, the advantages related to and/or the technical measures and considerations which will be required for at an indicated maximized limit value of the contact means, when the latter is moving in a direction away from its end position, to activate over the control equipment a means for being able to elevate the contact means out of its cooperation with the track.

There is a technical problem in being able to understand the significance of, the advantages related to and/or the technical measures and considerations which will be required for activating over the control equipment, at an indicated maximized limit value of the contact means when the latter moves in a direction towards its central position, a means for being able to lower the contact means down towards and for its cooperation with the track.

The Solution

As its starting point this invention utilizes the known technology indicated by way of introduction and is based on a rail structure as a track along a roadway section and is intended to be used in an electrically propellable vehicle, said vehicle including a vehicle-related control unit and a vehicle-related charging system for adapting in an electrically, i.a. by one or more batteries or a set of batteries, conveyable vehicle being driven along a stretch of a roadway and its associated roadway sections or portions, said system may comprise; "a" a plurality of roadway sections or portions subdividing the extension or stretch of the roadway, wherein each one of these road sections or portions is allotted one or more elongated tracks, grooves or slots, having introduced therein conductor bare surfaces such as conductor surfaces or strips, which may be supplied with power or current and which may be placed under voltage by means of a switch to one or more power sources, external to the vehicle, such as electric stations, so as to thereby be able to charge said set of batteries allotted to the vehicle, but primarily over said set of batteries driving the vehicle along the extension of the roadway and its roadway portions, and "b" one or more vehicles which may be driven by an electric motor or motors and wherein the respective vehicles exhibit a power control circuit for required power adapted to create a required power and/or speed control, wherein said vehicle, on its underneath side, is provided with an up and down and sideways, respectively, counted crosswise to the direction of transportation of the vehicle, displaceable contact means or current collectors and in which said elongated tracks, grooves or slots extend along the roadway of the roadway sections or portions, wherein said contact means is coordinated with a vehicle related control equipment or an arrangement for creating an adaptation of the contact means at least to offer a mechanical and electrical contact to said conductor or strip, wherein a coordination between the voltage-carrying conductors allotted to the roadway sections or portions and the contact means of the vehicle occurs over coordinated current collectors or removers, such as in the form of contact springs, adapted for mechanical and electrical cooperation with respective ones of the voltage-carrying conductors or strips and that the rail structure is adapted to receive the current collectors and accept to leave said collectors.

The present invention has the purpose of indicating a further development of the rail structure mentioned above and the structure mentioned above within the system disclosed above and apart from this to indicate utilization of the prerequisites mentioned above, where said rails and/or tracks are to be disposed parallel within the rail structure such as with external wall sections made of metal and a partition separating the external wall sections.

A first conductor surface, which may be subjected to voltage, is allotted a lower portion of a first track limited by a first external wall section and said partition.

A second conductor surface, which may be subjected to voltage is to be allotted a lower portion of a second track limited by a second external wall portion and said partition.

It is particularly indicated that the partition is to be made of an electrically conductive and/or an electrically insulating material.

The first track is then to be allotted a first electrically insulating layer applied to two surface portions facing each other for the first wall section and the partition, which insulating layer is to be coordinated with a lower portion and to be intended to support a first conductor surface, which may be subjected to voltage.

The second track is then to be allotted a second electrically insulated layer applied to surface portions facing each other for the second wall section and partition, which insulating layer is to be coordinated with a lower portion and to be intended to support a second conductor surface, which may be subjected to voltage.

The first electrically conductive layer is to be separated from the second electrically insulating layer by said partition.

At least one of two or more electrically insulating layers are to be adapted to form an upper edge located below an upper edge portion of its allotted track.

The wall sections and partition are to be structured by an electrically insulating material and shaped to a portion in the form of a rail structure, which in cross section has given the shape of an "E".

The three parallel shanks of the portion shaped to an "E" are to be shaped with equal thicknesses and lengths with regard to themselves.

The track-shaped piece of the electrically insulating material is enclosed by a rail structure shaped to a "U" and consisting of electrically conductive material.

The free ends of the "E"-shaped piece support one or more electrically conductive conductors or surfaces for ground potential.

The two tracks of the "E"-shaped piece support the first and second conductors allotted each a lower portion.

It is furthermore indicated that the vehicle-related contact means or current collector is adapted to be supported by and comprise an elongated arm whose end portion is rotatably fastened to the bottom or the lower portion of the vehicle and whose other end portion is adapted to support said contact means, wherein at the lower portion of the vehicle one or more sensors are to be adapted and intended to be able to sense the existence of and the orientation of a track disposed along the roadway in a rail structure and to lead over such sensed information to a control equipment, with the control equipment being adapted to include a control circuit which at a sensed existence and a sensed orientation falling within a defined area of coverage is adapted to actuate a means lowering or lifting the contact means.

As additional proposed embodiments, falling within the scope of the present invention, an arrangement is particularly indicated in which one end portion of the elongated arm is to be oriented in front of a second end portion, counted in the momentary direction of travel of the vehicle.

As an alternative it is proposed that one end portion of the elongated arm is to be oriented behind a second end portion, counted in the momentary direction of travel of the vehicle.

Particularly it is indicated that said contact means is to be allotted an elongated shape and extension and is to be rotatably fastened to the other end area of the elongated arm over a vertical axis of rotation.

It is furthermore proposed that in relation to a vertical plane allotted to the vehicle, such as a plane connecting to a chosen direction of travel, the contact means with its elongated shape is to be able to take an angular value with regard to the longitudinal extension of the elongated arm and a central line, corresponding to the angular value of this arm as compared to a vertical plane allotted to the vehicle.

The contact means or current collector is to be adapted to support at least two contact devices oriented after each other for common withdrawal of current from the two electrically conducting conductors of the third source of energy.

Connecting conductors belonging to the vehicle and being able to transfer voltage and current are adapted to extend along said elongated arm in a direction from one of its ends and furthermore over to the vehicle and to a circuit distributing one or more sources of power.

Furthermore it is proposed that sensor units allotted to the vehicle, such as side-related ones, are to be connected to the control equipment and intended to indicate a maximized limit value of the displacement of the contact means.

At an indicated maximized limit value of the contact means, when the latter moves in a direction from its end position, a means is activated over the control equipment for being able to elevate the contact means out of cooperation with the track and its electrically conductive conductor.

At an indicated maximized limit value of the contact means when the latter moves in the direction towards its end position, a means is activated over the control equipment for being able to lower the contact means to and towards a cooperation with the track and its electrically conducting conductor.

Advantages

The advantages which primarily must be considered to be characterizing of the present invention and the thereby indicated specific significant characteristics are that thereby prerequisites have been created for in a vehicle-related arrangement according to the preamble of claim 1 indicating that said track are to be oriented parallel within the rail structure with external, such as made of metal, wall sections and a partition separating the external wall sections, that a first conductor surface, which can be subjected to voltage, can be allotted a lower portion for a first track limited by a first external wall section and said partition, and that a second conductor surface, which can be subjected to voltage, can be allotted a second portion for a second track limited by a second external wall portion and said partition.

It is further indicated that the vehicle and its vehicle-related contact means are to be adapted to comprise an elongated arm, one of whose end portions is rotatably attached to the bottom of the vehicle and whose other end portion is adapted to support said contact means adapted for a cooperation with a rail structure according to the present invention.

The primary subject matter of rail structure related to a vehicle in accordance with the present invention is disclosed in the characterizing portion of the following patent claim 1.

SHORT DESCRIPTION OF THE DRAWINGS

Figure 1B:
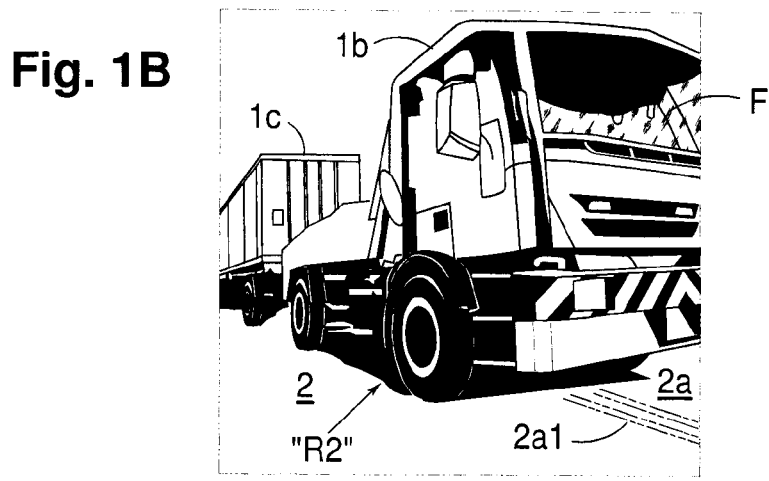
Figure 1C:
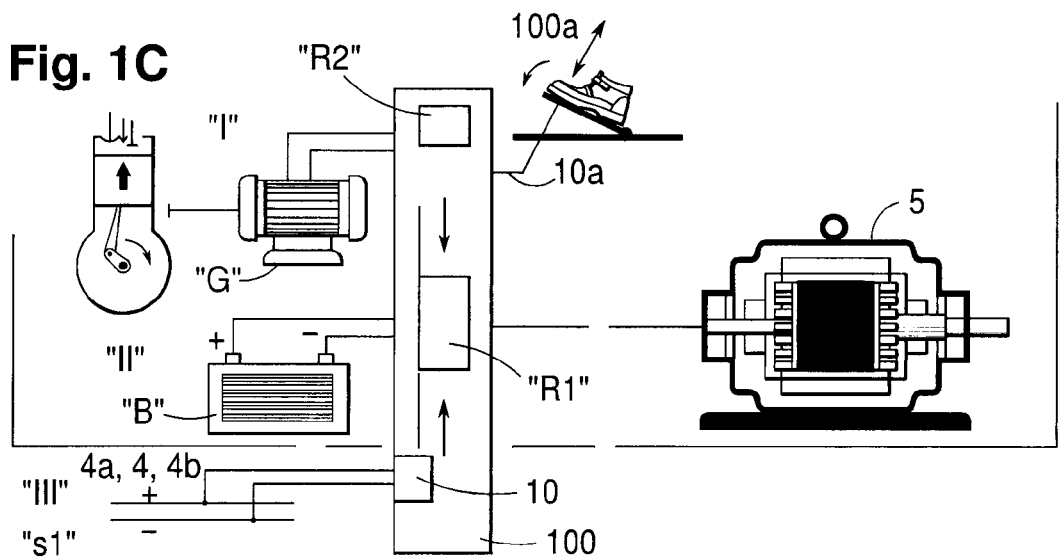
Figure 5:
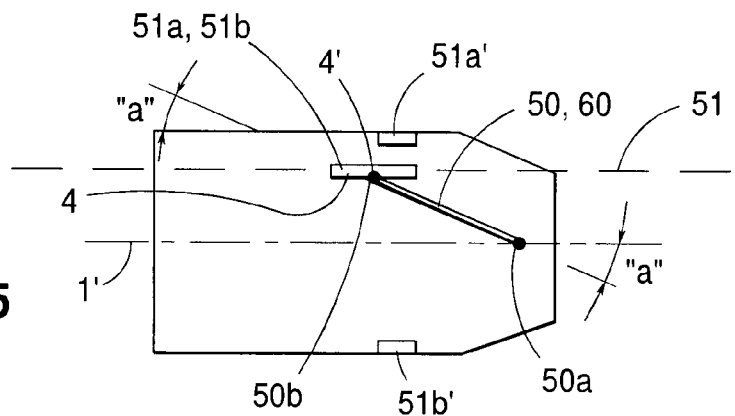
Figure 6:
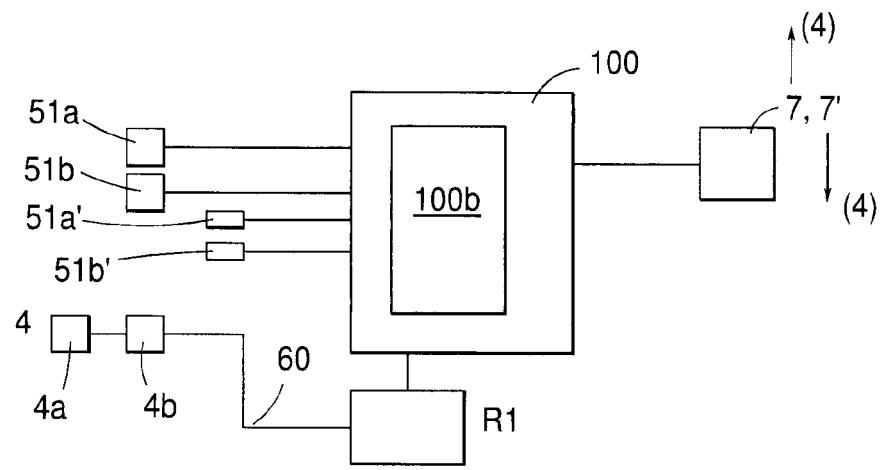
Figure 7:
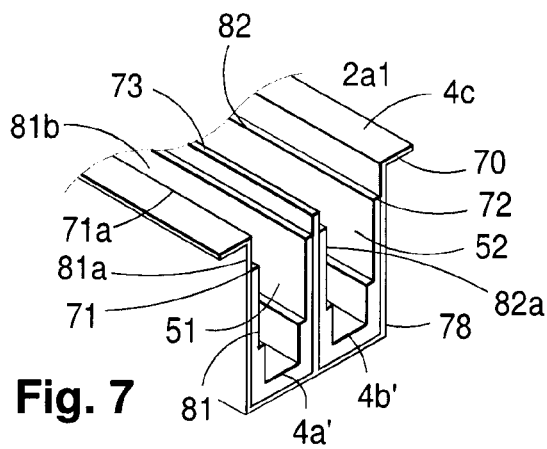
Figure 8:
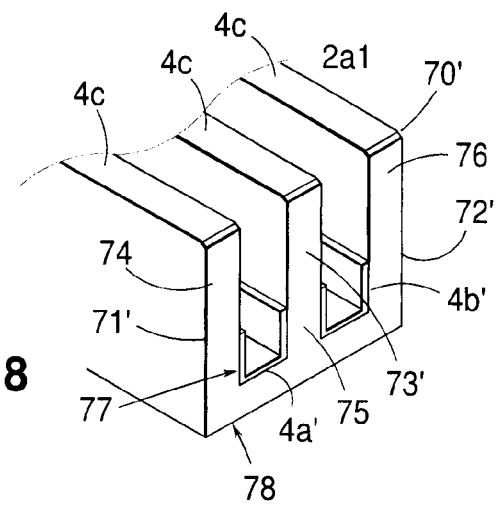

Prior art and presently proposed embodiments, exhibiting the significant characteristics related to the present invention, will now, as an example, be described more specifically with reference to the accompanying drawings in which;

FIG. 1A shows a perspective view of a vehicle, illustrated as a Ford Model A, converted to being battery powered and having an electrically powered engine or motor, a control circuit controlling the power for speed control and adaptation to an instantaneously acting load and necessary power as well as a control arrangement or control equipment intended for use in driving and steering the vehicle, FIG. 1B shows a perspective view of a truck with a trailer and with a control circuit controlling the power in accordance with the basic principles of FIG. 1A, FIG. 1C shows in an overview three vehicle-related power sources, a first one ("I"), a diesel generator, a second one ("II"), a battery or a battery set, and a third one ("III"), an external source of power to the vehicle, feeding electric power to parallel conductor surfaces, such as rails or strips, which may be subjected to power or voltage and which surfaces are arranged in continuous grooves in a roadway and coordinated to a vehicle-related control circuit, which in response to a necessary supplied power to an electric motor makes possible the selection of all or a combination of the power-feeding sources of energy, wherein the power control is illustrated here as a throttle having its motion related to a control circuit "R2", FIG. 1D illustrates a P/t-diagram (power/time) wherein full power or reduced power is to be transferred over the control circuit to the vehicle to pass along a roadway, its road sections or portions and its conductors or strips, FIG. 2 basically shows an electric arrangement related to a vehicle having control equipment for controlling a current collector or commutator arranged against electric contact surfaces, with paired conductors shaped as rails or strips for enabling parallel operation of an electric vehicle-related motor from one or both of the two power sources (first and second ones) related to the vehicle and/or from a stationary (third) source of power related externally to the vehicle or the peripheral (third) source of power, FIG. 3 shows an end view of a vehicle with its downwardly directed contact means or current collectors in the form of sliding contacts in cooperation with two individual contact surfaces, such as conductors, strips or rails, allotted to the road section or portion and being under power or tension, FIG. 4 shows an example of an electric arrangement in which a number of road sections or portions are provided with parallel contact surfaces as conductors or strips under power or tension, each one being connectable over a switch to its vehicle external or peripheral electric station, and in which roadway section or portion after roadway section or portion may be activated and are placed under power or voltage by activating a coupling means or a switch over a control unit as said vehicle passes roadway section after roadway section, FIG. 5 shows a vehicle from below with an arm being disposed rotatably adjacent to one of its end portions and contact means or current collectors being disposed adjacent to the other end portion of the arm, FIG. 6 illustrates in the form of a block diagram a proposed circuit arrangement related to the embodiment of FIG. 5 and utilizing a control circuit or a central unit, FIG. 7 illustrates in a perspective view a cross section of a first rail structure or track in accordance with the invention, FIG. 8 illustrates in a perspective view a cross section of a second rail structure or track, and FIG. 9 illustrates a cross section of a third rail structure or track.

DESCRIPTION OF THE PRESENTLY PROPOSED EMBODIMENTS

By way of introduction it shall be mentioned that in the following description of presently proposed embodiments exhibiting the significant characteristics related to the invention and being clarified by the figures, illustrated in the accompanying drawings, we have chosen terms and specific terminology with the purpose of thereby primarily clarifying the concept of the actual invention.

However, in this connection it should be noted that the terms chosen here shall not be seen as limiting solely to the terms utilized and chosen here and it should be understood that each such chosen term is to be construed such, that it in addition will be able to include all technical equivalents which operate in the same manner or essentially the same manner so as thereby to be able to achieve the same or essentially the same purpose and/or the same technical result.

Thus, with reference to the accompanying drawings, the basic prerequisites of the present invention are shown schematically and in detail, with the significant characteristics related to the invention being concretized in consequence of the now proposed and in the following more specifically described embodiments.

Thus, FIG. 1A shows a system "S" adapted for driving an electrically, and by one or more batteries or a set of batteries, propellable vehicle 1 along a stretch of a roadway 2 and its roadway sections or portions 2a1 and 2a1'.

Exterior ally the vehicle 1 consists of a Ford Model A, but this is converted to a battery powered vehicle having continuous access to an external third source of power or energy, which here is designated "III" and "s1" for a stationary station.

The vehicle 1 according to the invention is also to comprise a not shown steering arrangement 3 or steering equipment so that a driver "F" (not shown) can drive and steer the vehicle 1 along said stretch of roadway 2 and its road section or portion 2a1.

Vehicle 1 would also be able to include a gear box and other parts and components which are required for advancing the vehicle, but as these parts are well-known to a person skilled in the art they will not be described in detail.

However, an electrically driven vehicle 1 does not need a gear box as speed control and adapted power can occur over known electric and electronic circuits.

In the same manner as FIG. 1A, FIG. 1B shows an electrically propellable truck 1b with a connected trailer 1c along the stretch of roadway 2, 2a and its associated roadway section or portion 2a1.

FIG. 1C clearly shows two vehicle-related and vehicle-associated sources of power, which here are designated "I" and "II", a "first" one in the form of a diesel generator "G", a "second" one in the form of a battery or a set of batteries "B", and a "third" one "III" in the form of a source of power positioned externally of the vehicle 1, here taking the form of parallel conductive surfaces, such as conductors, rails or strips, which may be subjected to power or voltage over switching means or switches, and introduced into tracks, grooves and/or a cavity along each roadway section or portion along the entire stretch of the road 2.

In FIG. 1C the three sources of power are coordinated to a vehicle-related power control circuit 100, which in response to a power supplied to an electric driving motor 5 chooses all or a combination of the three power feeding energy sources "I", "II" and "III", respectively. Here the power control is illustrated as a throttle 100a, the movement of which upwards and downwards s connected to a control circuit "R2" in power control circuit 100, which in turn is related to a circuit "R1" distributing power and energy between the three power sources.

In a P/t (power/time) diagram FIG. 1D illustrates how full power or reduced power can be distributed and transferred for passage of the vehicle 1, 1b along different roadway sections or portions 2a1 of a roadway or stretch of a roadway 2 with the help of said circuit "R1" and control circuit "R2" and the power control circuit "100".

Between moments $t_1$-$t_2$ it is basically illustrated how a complete removal of power from the three power sources "I", "II" and "III", respectively, can be carried out, with the power taken out from the power source "I" illustrated at the top, the power taken out from power source "II" illustrated therebelow, and the power taken out from power source "III" illustrated at the bottom.

Reduced removal of power from power sources "I" and "II" is basically illustrated between the points of time $t_3$-$t_4$, whereas power source "III" is shown disconnected in this case.

Reduced removal of power from power sources "II" and "III" is illustrated basically between the points of time $t_5$-$t_6$.

During this time period $t_5$-$t_6$ full power can be achieved from power source "II", and a small surplus can be permitted to be fed to the motor 5 and trickle charge the battery set "II", "B".

The invention is based on that the set of batteries "B" and the second power source "II" but particularly the third power, source "III" primarily shall, over the distributing circuit "R1", supply motor 5 with power and for this purpose the set of batteries "II", "B" will have to have stored power and apart from this will have to be dimensioned so as to drive motor 5 at full power.

The set of batteries "II", "B" is primarily to be trickle charged via power source "III", "s1" and secondarily to be trickle charged or charged over power source "I", "G".

The power or energy from power sources "I" and "III" can be chosen to be 5-30% of the power or energy associated with power source "II", "B" such as around 25%.

The supply power or voltage to motor 5 can be chosen to +400 VDC and −400 VDC, i.e. the voltage value of 800 VDC is to be fed to the motor 5.

System "S" in FIG. 1A is then primarily to comprise "a" one or more over an individual electric motor 5 or motors electrically powerable vehicles 1, 1b, with the respective vehicles exhibiting a power distributing and/or controlling control circuit "R1", within said power control circuit 100, and for creating a necessary power and/or a speed control, via a control circuit "R2" and a throttle arrangement 100a.

The necessary output power is to be supplied primarily by the vehicle-internal power source of energy "II", "B", which secondarily is to be placed under trickle charging from the third power source of energy "III", "s1".

The stretch of a roadway 2 is in FIG. 4 shown divisible into road sections or portions 2a (2a1, 2a2, 2a3); 2b (2a1', 2a2' and 2a3'), wherein each one to advantage can be allotted to an external power source "III", which here is illustrated as a number of electric stations "s1", "s2", "s3"; "s1'", "s2'", "s3'".

Of the third power source "III", "s1", external to the vehicle 1, and/or the first power source "I", "G", associated with the vehicle, one or both can thereby be utilized for supplementary charging the set of batteries "II", "B" of the vehicle 1 during an adapted time sequence of power removal from this set of batteries.

Within the scope of the invention there is also the possibility of in addition to driving the vehicle 1 via the set of batteries "II", "B" and in supplementary charging the set of batteries "II", "B" along the road sections or portions and the stationary electric station "s1" or any of the third power source of energy "III", any additional necessary power and energy for driving the vehicle 1 over a road section or portion 2a1 can be supplied via power source "I", "G" associated with the vehicle.

FIG. 2 basically shows an electrical/mechanical switching arrangement "K" related to a vehicle 1, (1b) in a schematically illustrated vehicle-related arrangement in the form of control equipment 10 for controlling a contact member or a current remover or collector 4 associated with the vehicle 1, and to an electric contact with pairs of contact surfaces, as leads or strips, which may be placed under power or voltage and in the form of rails or strips 4a, 4b for the possible common driving in parallel of an electric motor 5 from the set of batteries "II", "B" and/or from the stationary station "III", "s1" and/or from the diesel generator "I", "G".

In this case current remover or collector 4 is related to a support 6 which may be displaced upwards and downwards vertically by means of a first electric auxiliary motor 7 and may be moved sideways back and forth by a second electric auxiliary motor 8.

The means and the control of auxiliary motors 7, 8, which are required for this movement with the assistance of sensors, are not shown in detail.

Both auxiliary motor 7 and auxiliary motor 8 may be activated in a movement directed forward and backward, wherein a first motion is activated over a first signal on a first conductor 7a and a first signal over a first conductor 8a, respectively, whereas a second (opposite) motion is activated by means of a second signal over conductors 7a and 8a, respectively, while the instantaneous setting positions of motors 7, 8 and support 6 are evaluated by one or more, not shown, sensors and are indicated by means of a generated signal on a second conductor or lead 7b and 8b, respectively.

These signals on the first conductors 7a, 8a are generated in a central unit or a power control circuit 100 having control equipment 10, and signals on the second conductor 7b and 8b are generated in the same central circuit 100 while utilizing position sensors (not shown).

Said power control circuit 100 with control equipment 10 is a complex unit, which i.a. over a sensor 16 is to be able to sense the existence of and the orientation of conductor surfaces, such as conductors or strips 4a, 4b, and thereafter to lower the current remover or collector 4 by means of auxiliary motor 7 to electric contact with these two conductors 4a, 4b, which here are illustrated as being placed under voltage.

Over a connection 10a to power control circuit 100 and its control circuit "R2" the power and energy which over circuit "R1" distributing the energy sources is supplied to motor 5 and is here controlled by throttle arrangement 100a. For this purpose circuit "R2" will have to be controlled directly by said throttle arrangement 100a (FIG. 1C) so as to supply motor 5 with a required power over the circuit "R1".

In the illustrated position the current collector or remover 4 conducts current and voltage from power source "s1", "III" over to the power and energy distributing circuit "R1". The latter or a control circuit "R2" senses the power requirement of motor 5 over its central unit 100 and primarily feeds motor 5 with the power it needs according to the input signal on the connection or conductor 10a and generated output signal on the connection or conductor 10b so as thereby to load the stationary system "III", "s1" and supplement the power and energy requirements over battery setting "II", "B".

Connecting in parallel the power "III", "s1" taken out of the vehicle externally and the power "I", "G" and/or "II", "B" generated within the vehicle can here be carried out over circuits "R1" and control circuit "R2" and with the assistance of power control circuit 100.

Information about a desired speed and thereto related power of vehicle 1 is supplied to power central circuit 100 over conductor 10a, and circuit "R1" is affected over conductor 10b via internal circuits, which are not shown, and the function of the control circuit "R2" and control equipment 10.

FIG. 3 shows an end view of a vehicle 1, (1b) with its downwardly directed current collector or remover 4 in mechanical and electrical cooperation with the two live contact surfaces, as conductors, rails or strips 4a, 4b associated with road portion 2a1' and a connection 4c to ground.

FIG. 4 shows an electric switching arrangement "K1", in which roadway section or portion after roadway section or portion 2a1, 2a2, 2a3 and 2a1', 2a2' and 2a3', respectively, with their station or stations "s1", "s2", "s3" and "s1'", s2'" and "s3'", respectively, can be activated and made to conduct power as voltage from one and the same controlled power source "III", 42 over switching means and switches 43a, 44a, and 45a for one stretch of a roadway 2a and 43a', 44a' and 45a' along the opposite stretch of a roadway 2b, depending on whether a vehicle 1, 1b will pass along the electrically separate but with longitudinal tracks or grooves coordinated roadway 2a, 2b sections or portions.

For this a number of switches or connecting means for connecting and disconnecting stations "s1", "s2" . . . will be needed, wherein this connecting and disconnecting can occur over stationary sensors (not shown) related to the section or portion of the roadway.

The present invention proceeds further on the prerequisites mentioned above and indicated according to FIG. 5 in that contact means 4 related to the vehicle are adapted to comprise an elongated arm 50, one end portion 50a of which is rotatably attached to the bottom side of the vehicle 1 and the other end portion 50b of which is adapted to support said contact means or current collectors 4.

One or more sensors 51a, 51b are disposed at said contact means 4' and are intended to be able to sense the existence of and the orientation of a track 51 and to transfer sensed information to the control equipment 100.

The control equipment 100 is adapted to comprise a control circuit 100b which is adapted, at a sensed existence and a sensed orientation of the track 51 within a chosen area of coverage, to affect means 7' lowering contact means 4 or means 7 lifting contact means 4.

One end portion 50a of the elongated arm 50 is disposed in front of the second end portion 50b, counting in the momentary direction of travel of the vehicle.

One end portion 50a of the elongated arm 50 is oriented behind the other end portion 50b, counting in the momentary direction of travel of the vehicle.

Said contact means 4 is allotted an elongated extension and is rotatably attached to the other end portion 50b of the elongated arm over a vertical axis of rotation 4'.

In relation to a vertical plane 1' allotted to the vehicle 1, such as a plane connecting to a chosen direction of travel, contact means 4 with its elongated shape is to be able to be placed in an angular value of "a" with regard to the elongated arm 50 corresponding to the angular value "a" of this arm in relation to the vertical plan allotted to the vehicle.

Contact means 4 is adapted to support at least two after each other oriented contact means designated 4a and 4b, respectively.

Connecting conductors 60 internal to the vehicle and being placeable under voltage and current are adapted to extend from contact means 4 (4a, 4b) along said elongated arm 50 in a direction towards its end portions 50a and over to vehicle 1 and to a circuit "R1" distributing to one or more sources of power.

Sensor units 51a', 51b' allotted to vehicle 1, such as side-related, are connected to control equipment 100 and intended to indicate a maximized limit value of contact means 4.

At an indicated maximized limit value of contact means 4, when the latter moves in a direction from its end position, a means 7' is activated over control equipment 100 for being able to elevate contact means 4 out of cooperation with track 51 and its conductors 4a, 4b and conductor surfaces 4a', 4b'.

At an indicated maximized limit value of contact means 4, when the latter moves in the direction towards its central position, means 7 is activated over control equipment 100 for being able to lower contact means 4 towards cooperation with its rail structure and track 51 and its conductors 4a', 4b'.

With reference to FIGS. 7 and 8 it is illustrated how the mentioned rail structure or tracks 51, 52 or gaps in a cross section are oriented parallel within a rail structure 70, 70' having external wall sections 71, 72; 71', 72' made of metal and a partition 73; 73' separating the external wall sections.

A first conductor surface 4a', which may be subjected to tension, is allotted a lower portion for a first track 51 restricted by a first external wall section 71 and said partition 73.

A second conductor surface 4b' which may be subjected to tension, is allotted a lower portion for a second track 52 limited by a second external wall section 72 and said partition 73.

In FIG. 7 partition 73 is made of an electrically conductive material and in FIG. 8 is made of an electrically insulating material.

The first track 51 is allotted to a first electrically insulating layer 81, 81a applied to two surface portions facing each other for the first wall section 71 and the partition 73.

This insulating layer 81, 81a is coordinated with the lower portion and intended to support the first conductor surface 4a' which may be subjected to voltage.

The second track 52 is allotted a second insulating layer 82, 82a applied to two surface portions facing each other for the second wall section 72 and the partition 73, and this insulating layer is coordinated with the lower portion and intended to support the second conductor surface 4b', which may be subjected to voltage.

The first electrically conductive layer 81, 81a is separated from the second electrically insulating layer 82, 82a by said partition 73.

At least one, two or more electrically insulating layers are adapted to form an upper edge 81b located below an upper edge portion 71a of its allotted track 71.

Wall sections 71', 72' of FIG. 8 and partition 73' are made of a piece of electric insulating material shaped into a rail structure, which in cross section has been given the form of an "E" and which can consist of a plastic or composite material.

The three parallel shanks 74, 75 (73'), 76 of the piece shaped into an "E" are made with mutually equal thicknesses and lengths.

The rail-shaped piece 77 of electrically conductive material is enclosed by a rail structure 78 shaped into an "U" and made of electrically conductive material.

The free ends of "E"-shaped portion 77 carry one or more electrically conductive conductors 4c of metal or other conductive material so as to form proactive ground.

The two tracks of the "E"-shaped piece support the first and second conductor surfaces, allotted each to a lower portion.

The top of the wall of track 51, 52, according to FIG. 7, consists of metal or some other conductive material which is connected to ground potential. Hereby it is avoided that a person stepping on a track 51, 52 filled with water will be subjected to harmful currents through his or her body from conductor surfaces 4a' and 4b', even if said person would happen to be barefooted.

An important detail in designing the tracks and rail structure is that contact surfaces 4a', 4b' are of U-shape so that current collector 4 can be guided to the middle of the track (see FIG. 9). In this manner contact 4 is avoided with the walls which are made of insulating material, and which perhaps does not have the same durability as a current rail which is made of steel or the like. The walls can be made of plastic or ceramics or glass or some other insulating material.

With reference to FIG. 9, the latter shows a cross section of a third embodiment of a rail structure 70" having two rails 51, 52 with a current collector 4 shown in cooperation with an upper contact surface 4b' of conductor 4b.

This illustrates a structure 70" of a rail structure having a surrounding portion 78 of metal (steel), an electric insulation 71' and 72' and a thermal insulation 71", 72" as well as an electric cable 51a, 52a for heating the lower portions of tracks 51, 52 and being built into conductors 4a and 4b with electric insulation.

The importance of introducing a heating cable 51a, 52a is that conductor surfaces 4a', 4b' can be retained free from ice even when the external conditions are very cold.

The invention is of course not limited to the embodiment disclosed above as an example, and it can be subjected to modifications within the frame of the inventive concept illustrated in the following.

Is should be particularly noted that each shown unit and/or circuit can be combined with each other illustrated unit and/or circuit within the frame of being able to reach the desired technical function.

Some of the following reference numerals have been introduced into FIGS. 1 to 4;
- a. 1. Vehicle illustrated as a Ford Model A.
- b. 1b. Truck
- c. 1c. Trailer to truck "b".
- d. 2. Stretch of a roadway
- e. 2a. Roadway in one traveling direction
- f. 2b. Roadway in an opposite traveling direction
- g. 2a1. Roadway section in one traveling direction
- h. 2a1". Roadway section in an opposite direction
- i. 3. Steering equipment
- j. 4. Vehicle related contact means as current remover
- k. 4a. Electrical conductive first rail
- l. 4b. Electrical conductive second rail
- m. 4c. Roadway section related electrical conductor
- n. 4a". Electrical conductive first surface
- o. 4b". Electrical conductive second surface
- p. 5. Vehicle related DC-motor
- q. 6. Support for vehicle related contact means (j)
- r. 7, 8. Auxiliary motors
- s. 10. Control equipment for contact means (j)
- t. 30. Canalization for electric conductors (k, l, m.) and including grooves (u, v.)
- u. 51. First roadway section related groove
- v. 52. Second roadway section related groove
- w. 100. Power control circuit
- x. "I". First vehicle related power source (Generator)
- y. "II". Second vehicle related power source (Battery set.)
- z. "III". Third power source, vehicle external (Ground Station)
- aa. "F". Driver (not shown.)
- bb. "R1". Energy distributing and three power sources controlling circuit
- cc. "R2". Control circuit for energy distribution (Speed control)
- dd. "S". Vehicle and roadways related system

The invention claimed is:

1. A rail structure related to a track of a system for propelling an electrically propellable vehicle, by one or several batteries or a set of batteries, along a roadway comprising a plurality of roadway sections, the system comprising:

"a" a plurality of roadway portions for subdividing the roadway into said roadway sections, wherein each one of the roadway sections comprises one or more elongated tracks or slits having conductors introduced therein adapted to be supplied with current and put under voltage, and being connectable via a switch to one or more vehicle-external power sources, including vehicle-external electric stations, for thereby enabling a charging of said set of batteries belonging to the vehicle, but primarily driving the vehicle along the roadway and the roadway sections, and "b" one or more driveable or propellable vehicles which may be driven by means of an electric motor or motors, with each of the respective vehicles comprising a control circuit adapted for necessary distribution of power, adapted for creating a required power and/or speed control, wherein said vehicle is provided on its underneath side with contact means displaceable up and down and sideways, in relation to the direction of transportation of the vehicle, wherein said elongated track or tracks and the conductors extend along the roadway and the roadway sections and wherein said contact means is coordinated with a vehicle-related control equipment for creating an adaptation of the contact means so as to at least offer a mechanical and electrical contact with said conductors, wherein coordination between the conductors put under voltage, belonging to the roadway section and the contact means of the vehicle occurs via coordinated current collectors in the form of contact springs, adapted for mechanical and electrical cooperation with respective ones of the conductors put under voltage, wherein the rail structure comprises one or more tracks oriented parallel with external wall sections made of metal, and a partition separating the external wall sections and comprising an intermediate wall made of an electrically conductive material;

wherein a first conductor is arranged in a lower portion of a first track delimited by a first external wall section and said partition and a second conductor is arranged in a lower portion of a second track delimited by a second external wall section and said partition wherein the first track comprises a first electrically insulating layer applied to surface portions facing each other of said first wall section and the partition, the first insulating layer being coordinated with the lower portion and intended to support the first conductor, wherein the second track comprises a second electrically insulating layer applied to surface portions facing each other of said second wall section and the partition, the second insulating layer being coordinated with the lower portion and intended to support the second conductor.

2. The rail structure in accordance with claim 1, wherein the first electrically insulating layer is separated from the second electrically insulating layer by the partition.

3. The rail structure in accordance with claim 1, wherein at least one electrically insulating layer is adapted to form an upper edge located below an upper edge portion of the corresponding track.

4. The rail structure in accordance with claim 1, wherein the wall sections and the partition are formed in a rail shaped piece consisting of electrically insulating material which in a cross section has been shaped to the form of the letter "E".

5. The rail structure in accordance with claim 4, wherein three parallel legs of the part shaped as the letter "E" are all formed with the same thickness and length.

6. The rail structure in accordance with claim 4, wherein the rail shaped part of electrically insulating material is enclosed by a rail of electrically conductive material having the shape of the letter "U".

7. The rail structure in accordance with claim 4, wherein the free ends of the "E"-shaped piece support one or more electrically conductive conductors.

8. A rail structure in accordance with claim 4, wherein the two shanks of the "E"-shaped piece support the first and second conductor surfaces allotted each to lower portion.

9. The rail structure in accordance with claim 1, wherein vehicle-related contact means comprising the current collector comprises an elongated arm, wherein a first end portion is rotatably fastened to the bottom of the vehicle and a second end portion is adapted to support said contact means, wherein one or more sensors are arranged on the lower portion of the vehicle and adapted to detect the existence of and the orientation of a track and to transfer detected information to the control equipment, wherein the control equipment comprises a control circuit which is adapted to control a means for lowering the contact means when the existence and orientation of a track within a coverage area is detected.

10. The rail structure in accordance with claim 9, wherein the first end portion of the elongated arm is disposed in front of the second end portion, in relation to the momentary direction of travel of the vehicle.

11. The rail structure in accordance with claim 9, wherein the first end portion of the elongated arm is disposed behind the second end portion, in relation to the momentary direction of travel of the vehicle.

12. The rail structure in accordance with claim 9, wherein said contact means has an elongate extension and is rotatably fastened to the second end portion of the elongated arm about a vertical axis of rotation.

13. The rail structure in accordance with claim 12, wherein the contact means is adapted to be rotated about a vertical axis of rotation when the elongated arm is displaced such that the angle between the contact means and the elongated arm is substantially equal to the angle between the elongated arm and a vertical plane through the vehicle and parallel to the direction of travel.

14. The rail structure in accordance with claim 1, wherein the contact means is adapted to support at least two current collectors disposed after each other.

15. The rail structure in accordance with claim 9, wherein the vehicle comprises a connecting conductor adapted to extend along said elongated arm in a direction towards the second end portion between a circuit of the vehicle for distributing one or more sources of power and the current collector.

16. The rail structure in accordance with claim 9, wherein the vehicle comprises laterally located sensor units connected to the control equipment and adapted to indicate a maximized limit value for lateral displacement of the contact means.

17. The rail structure in accordance with claim 16, wherein the control equipment is adapted to activate the means for lowering the contact means to raise the from cooperation with the track and the conductor when the contact means is displaced in a direction from the central position to a lateral position exceeding the maximum limit value.

18. The rail structure in accordance with claim 16, wherein the control equipment is adapted to activate the means for lowering the contact means to lower the contact means into cooperation with the track and the conductor, when the contact means is displaced in a direction towards the central position from a lateral position exceeding the maximum limit value.

* * * * *